US012750214B2

(12) United States Patent
Islam et al.

(10) Patent No.: US 12,750,214 B2
(45) Date of Patent: Sep. 29, 2026

(54) SYSTEMS AND METHODS FOR ENHANCED SECURITY USING LOW ENTROPY SECRETS ON INSECURE ENVIRONMENTS

(71) Applicant: Dashlane SAS, Paris (FR)

(72) Inventors: Mohammed Ruhul Islam, Taverny (FR); Ludovic Widmer, Clichy (FR); Guillaume Maron, Paris (FR); Frédéric Rivain, Brooklyn, NY (US)

(73) Assignee: Dashlane SAS, Paris (FR)

( * ) Notice: Subject to any disclaimer, the term of this patent is extended or adjusted under 35 U.S.C. 154(b) by 87 days.

(21) Appl. No.: 18/984,084

(22) Filed: Dec. 17, 2024

(65) Prior Publication Data

US 2025/0317285 A1 Oct. 9, 2025

Related U.S. Application Data

(60) Provisional application No. 63/631,211, filed on Apr. 8, 2024.

(51) Int. Cl.

| | |
|---|---|
| ***H04L 9/08*** | (2006.01) |
| ***H04L 9/14*** | (2006.01) |
| ***H04L 9/32*** | (2006.01) |

(52) U.S. Cl.

CPC .............. *H04L 9/0869* (2013.01); *H04L 9/14* (2013.01); *H04L 9/3247* (2013.01)

(58) Field of Classification Search

CPC ........ H04L 9/0869; H04L 9/14; H04L 9/3247

See application file for complete search history.

(56) References Cited

U.S. PATENT DOCUMENTS

| | | | | |
|---|---|---|---|---|
| 10,681,038 | B1 * | 6/2020 | Lambert | H04L 9/3226 |
| 10,887,088 | B2 * | 1/2021 | Resch | H04L 9/0869 |
| 11,552,794 | B2 * | 1/2023 | Becher | G06F 7/582 |
| 2017/0195316 | A1 * | 7/2017 | Murdoch | H04L 63/0853 |
| 2017/0230179 | A1 * | 8/2017 | Mannan | H04L 9/3226 |
| 2018/0076956 | A1 * | 3/2018 | Camenisch | H04L 9/0861 |
| 2019/0349191 | A1 * | 11/2019 | Soriente | H04L 9/0844 |
| 2019/0356475 | A1 * | 11/2019 | Resch | H04L 9/085 |

* cited by examiner

*Primary Examiner* — Andrew Suh

(57) ABSTRACT

The present application describes systems and methods for enhanced security using low entropy secrets on insecure environments. A computing device receives a low entropy secret via an input mechanism. The computing device generates or identifies a local salt value and generates a blinding factor. The computing device performs a local blinding function that uses the low entropy secret, the local salt value, and the blinding factor to generate a blinded representation of the low entropy secret. A server performs an oblivious pseudorandom function that uses the blinded representation of the low entropy secret and a server secret value to generate a blinded output value. In some examples, the server performs an attempt limiting check function. The computing device performs a local unblinding function that uses the blinded output value and the blinding factor to generate a high entropy encryption key. The high entropy encryption key can be used to encrypt or decrypt data.

20 Claims, 8 Drawing Sheets

300

400

400

400

SYSTEMS AND METHODS FOR ENHANCED SECURITY USING LOW ENTROPY SECRETS ON INSECURE ENVIRONMENTS

CROSS-REFERENCE TO RELATED APPLICATIONS

This application claims the benefit of U.S. Provisional Patent Application Ser. No. 63/631,211 filed Apr. 8, 2024, the entirety of which is incorporated by reference herein.

BACKGROUND

Services that encrypt user data typically use a high entropy user secret (e.g., a password created by the user) to protect the user data. For example, a key may be derived from the high entropy user secret to protect the data through encryption. As level of complexity of the key correlates with the level of security of the data, the user secret is typically required to be high entropy. It is with respect to this general technical environment that aspects of the present application are directed.

SUMMARY

The present application describes systems and methods for enhanced security using low entropy secrets on insecure environments.

For example, aspects of the present application include a method comprising: receiving, by a first computing device, a low entropy secret value; generating, by the first computing device, a first cryptographically random value; identifying, by the first computing device, a second cryptographically random value, wherein the second cryptographically random value is associated with the computing device; generating, by the first computing device, a blinded representation of the low entropy secret value based at least in part on the low entropy secret value, the first cryptographically random value, and the second cryptographically random value; providing, by the first computing device and to a second computing device, the blinded representation of the low entropy secret value; receiving, from the second computing device and by the first computing device, a blinded output value that is based at least in part on the blinded representation of the low entropy secret value; generating, by the first computing device, a high entropy encryption key using the blinded output value and the first cryptographically random value; and encrypting or decrypting, by the first computing device, user data using the high entropy encryption key.

In some examples, the method further comprises generating, by the second computing device, the blinded output value by performing an oblivious pseudorandom function using the blinded representation of the low entropy secret value and a server secret value stored by the second computing device. In some examples, the method comprises performing, by the second computing device and using the low entropy secret value, an attempt limiting check function to limit a number of access attempts to the blinded output value. In some examples, generating the blinded representation of the low entropy secret value comprises performing a local blinding function based at least in part on the low entropy secret value, the first cryptographically random value, and the second cryptographically random value to blind the low entropy secret value. In some examples, generating, by the first computing device, the high entropy encryption key comprises performing a local unblinding function using the blinded output value and the first cryptographically random value to unblind the blinded output value. In some examples, the method further comprises generating, by the first computing device and during a registration cycle, a PIN code verification public key and a PIN code verification private key; encrypting, by the first computing device and during the registration cycle, the PIN code verification private key using a second high entropy encryption key generated during the registration cycle; providing, by the first computing device and during the registration cycle, the encrypted PIN code verification private key to the second computing device; providing, by the second computing device and during a login cycle after the registration cycle, the encrypted PIN code verification private key to the first computing device; decrypting, by the first computing device and during the login cycle, the encrypted PIN code verification private key using the high entropy encryption key generated during the login cycle; signing, by the first computing device and during the login cycle, information using the decrypted PIN code verification private key; providing, by the first computing device and during the login cycle, the signed information to the second computing device; verifying, by the second computing device and during the login cycle, the signed information using PIN code verification public key; and resetting, by the second computing device and during the login cycle, an attempt counter based at least in part on successfully verifying the signed information. In some examples, the first cryptographically random value is discarded after a single authentication cycle, after a single registration cycle, or both. In some examples, the second cryptographically random value is unique to the first computing device and is stored and used on the first computing device across one or more authentication cycles, registration cycles, or both.

In another example, aspects of the present application include a method, comprising: receiving, from a first computing device and by a second computing device, a blinded representation of a low entropy secret value; generating, by the second computing device, a blinded output value by performing an oblivious pseudorandom function using the blinded representation of the low entropy secret value and a server secret value stored by the second computing device; performing, by the second computing device, an attempt limiting check function; and providing, by the second computing device and to the first computing device, the blinded output value.

In some examples, the method further comprises resetting an attempt counter value based at least in part on an attempt counter value being less than a predefined login attempt threshold. In some examples, performing the attempt limiting check function limits a number of access attempts to the blinded output value. In some examples, the second computing device is a server comprising a secure enclave.

In another example, aspects of the present application include a system, comprising: at least one processor; and memory, operatively connected to the at least one processor and storing executable instructions that, when executed, cause the at least one processor to perform operations, the operations comprising receiving, by a first computing device, a low entropy secret value; generating, by the first computing device, a first cryptographically random value; identifying, by the first computing device, a second cryptographically random value, wherein the second cryptographically random value is unique to the computing device; generating, by the first computing device, a blinded representation of the low entropy secret value based at least in part on the low entropy secret value, the first cryptographically random value, and the second cryptographically random value; providing, by the first computing device and to a second computing device, the blinded representation of the low entropy secret value; receiving, from the second computing device and by the first computing device, a blinded output value that is based at least in part on the blinded representation of the low entropy secret value; generating, by the first computing device, a high entropy encryption key using the blinded output value and the first cryptographically random value; and encrypting or decrypting, by the first computing device, user data using the high entropy encryption key.

In some examples, the operations further comprise generating, by the second computing device, the blinded output value by performing an oblivious pseudorandom function using the blinded representation of the low entropy secret value and a server secret value stored by the second computing device. In some examples, the operations further comprise performing, by the second computing device and using the low entropy secret value, an attempt limiting check function to limit a number of access attempts to the second computing device. In some examples, generating the blinded representation of the low entropy secret value comprises performing a local blinding function based at least in part on the low entropy secret value, the first cryptographically random value, and the second cryptographically random value to blind the low entropy secret value. In some examples, generating, by the first computing device, the high entropy encryption key comprises performing a local unblinding function using the blinded output value and the first cryptographically random value to unblind the blinded output value. In some examples, the low entropy secret value comprises a personal identification number (PIN). In some examples, the first cryptographically random value is discarded after a single authentication cycle, a single registration cycle, or both. In some examples, the second cryptographically random value is unique to the first computing device and is stored and used on the first computing device across one or more authentication cycles, registration cycles, or both.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
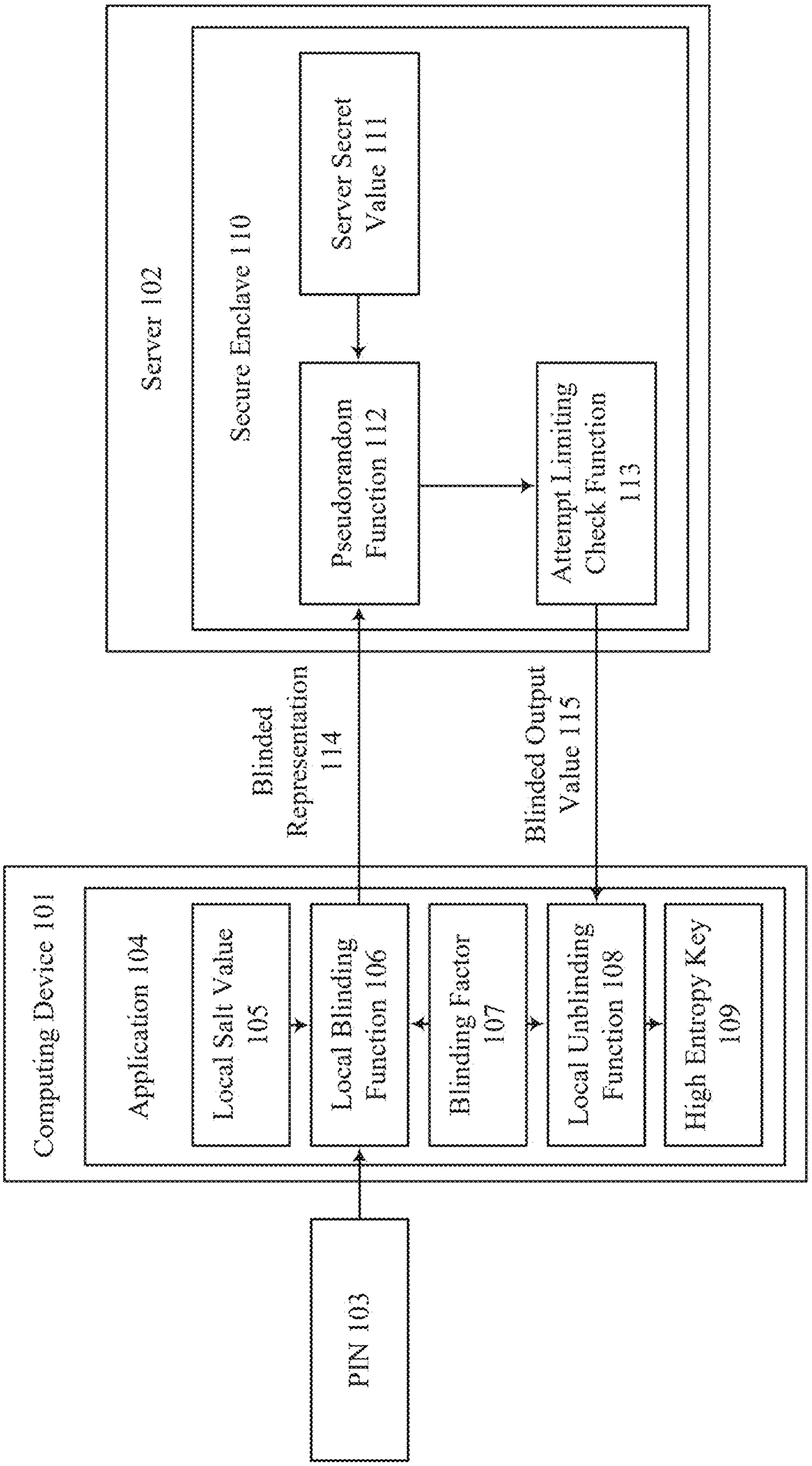
FIG. 1 is a block diagram depicting an example system according to aspects of the present application.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Data encryption typically involves a key derived from a high entropy secret (e.g., a password created by the user) to protect user data. The high entropy secret is typically required to be complex, as the complexity correlates with the level of security. For example, a more complex, high entropy password provides a higher level of security than a less complex, lower entropy password. An entropy of a secret is a measure of its unpredictability and the effort required to breach it. For example, a high entropy secret may have a high level of randomness, uncertainty, or unpredictability. A high entropy secret is more resistant to attacks than lower entropy secrets because it increases the unpredictability an attacker faces when trying to guess or determine the value of the high entropy secret. For example, a secret that is long, complex, and includes a mix of characters (uppercase, lowercase, numbers, symbols) may have high entropy. Conversely, a low entropy secret value has less randomness and is more predictable than higher entropy secrets (e.g., a password such as "12345" or "password").

However, high entropy secrets can easily be forgotten by a user. For example, "master passwords" commonly used by credential managers are typically required to be highly complex. Additionally, services requesting a password from a user may implement a strong password policy to ensure the user has selected a complex password (e.g., a password that has not yet been compromised and/or leaked to attackers or the public). A low entropy, easier to remember, device-bound secret is desirable in terms of convenience for the user. However, not all situations are appropriate to implement a low entropy secret. Using a low entropy secret to gain access to a service is typically possible on platforms where certain technology is available, and where the low entropy secret protects a high entropy secret. A robust rate limiting feature, which is typically implementable using a native application with access to specialized device hardware (e.g., a local secure enclave), has the ability to protect data via local user session credentials. A rate limiting feature is a protective measure used to prevent brute force attacks by limiting the number of times a user can attempt to log in. However, if the rate limiting feature is not implemented in a robust manner, the attacker may be able to manipulate the mechanism to have many access attempts beyond the limit, and the low-entropy secret can be determined in a brute force attack. Still, if possible, a personal identification number (PIN), or any other low entropy secret, with a robust rate limiting feature can be an effective security measure and is more convenient and user-friendly than a complex password. Additionally, PINs or other low entropy secrets provide a high recall factor, alleviating the user's burden of remembering high entropy secrets.

PINs and/or other low entropy secrets introduce security considerations for systems that rely on them. For example, PINs are increasingly used in the daily lives of users; users may re-use PINs on a variety of use cases, such as subscriber identity module (SIM) card locks, mobile device screen locks, bank cards, safety deposit boxes, and the like. In such circumstances, it is desirable that the PIN remains stored on the local computing device and is not provided from the local computing device (e.g., does not leak from the local computing device) in order to maintain security and PIN confidentiality. A solution that provides a user access to a service or data using a user-friendly, low entropy secret, while maintaining a high level of security and confidentiality for the service or data and for the user (e.g., the user's low entropy secret or PIN), is useful.

Examples herein provide for systems and methods for generating a high entropy local secret based on a low entropy secret value (e.g., a PIN) provided by a user, where the low entropy secret value is associated with a user device (e.g., the user device used to enter the PIN). In examples, a computing device generates or identifies a local salt (a cryptographically random value associated with the computing device) and generates a blinding factor (a cryptographically random value that changes). In some examples, the computing device combines the PIN and local salt to generate a salted PIN. The computing device may then perform a local blinding function that receives as input the salted PIN and the blinding factor to generate a blinded representation of the salted PIN. In examples, blinding refers to transforming an input, using a reversible operation, before providing the input to a computing device or computing service or application. For example, the computing device may transform the salted PIN using the blinding factor into a blinded representation of the salted PIN. The computing device may then provide the blinded representation of the salted PIN to a server. The server is able to perform valid operations on the blinded representation of the salted PIN (e.g., to a server) without determining or identifying the PIN itself. The server may perform an OPRF that receives as input the blinded representation of the salted PIN and a server secret value to generate a blinded output value. The server may then provide the blinded output value to the computing device. The computing device may perform a local unblinding function that receives as input the blinded output value and the blinding factor to generate a high entropy encryption key. The high entropy encryption key can then be used by the computing device to encrypt or decrypt data.

Such systems may provide security even when local software lacks access to the technology (e.g., a native rate-limiting application or a local secure enclave) to protect a high entropy secret with a low entropy secret value (e.g., a PIN). In examples, present systems and methods provide for the secure use of a PIN in environments, including the internet, where access to local hardware security features, or the ability to protect data based on an active user session, may be unavailable. In some examples, the server is unable to identify the low entropy secret value (e.g., PIN), does not store the high entropy encryption key, and is unable to identify the high entropy encryption key. In some examples, a rate limiting feature is implemented or controlled by the server, reducing the risk of brute force attacks, particularly when the attacker possesses the local device and/or data. Further, in examples, a secure enclave may be implemented by the server to prevent insider attacks that could bypass the rate limiting feature.

FIG. 1 depicts an example system 100 according to aspects of the present disclosure. System 100 includes computing device 101, server 102, and PIN 103. Computing device 101 includes at least one processor and memory and/or computer-readable storage storing instructions that comprise an application 104. Application 104 comprises, stores, and/or is configured to have access to local salt value 105, local blinding function 106, blinding factor 107, local unblinding function 108, and high entropy encryption key 109. In examples, server 102 includes secure enclave 110, server secret value 111, oblivious pseudorandom function (OPRF) 112, and attempt limiting check function 113.

It will be understood that other low entropy secret values may be employed other than PIN 103 (e.g., a simple password, a line pattern on a three-by-three grid). PIN 103 is merely one example of a low entropy secret. The term "local" as described herein refers to computing device 101—that is—stored on, implemented by, executed on, or the like, computing device 101. In some examples, PIN 103 may include a pseudo high entropy value (e.g., a complex password).

Computing device 101 is hardware operated by a user (e.g., a personal computer (PC), a mobile device). Computing device 101 may receive PIN 103 via an input mechanism (e.g., a keyboard) as part of an attempt to access or authenticate into a user account associated with a service (e.g., a password manager service) and/or to attempt to access user data (e.g., a user vault of passwords) stored by a system or device(s) managed by the service. In some examples, PIN 103 is entered in response to a prompt from application 104 via computing device 101. In some examples, application 104 runs on computing device 101 (e.g., as a client application) and is installed by a user of the service on the computing device 101. In some other examples, application 104 is hosted on the web or by the service. In some examples, PIN 103 does not leave computing device 101 in a form that is decipherable. For example, PIN 103 may not be provided to devices outside of computing device 101 in cleartext, and/or may be encrypted and provided in a way that is able to be decrypted by a receiver. Rather, PIN 103 may be blinded (or transformed using any other technique that renders PIN 103 indecipherable without the data used to perform the blinding). For example, the PIN 103 may be combined with local salt value 105 to generate a salted PIN, which may be blinded using blinding factor 107, and provided to server 102 as a blinded representation 114 of salted PIN 103, as described later.

Server 102 is a computing device that may be owned and/or controlled by the service. Server 102 may be a same or a different computing device than computing device 101 and may comprise multiple computing devices. Server 102 receives the blinded representation 114 of salted PIN 103 from computing device 101. In examples, server 102 may perform OPRF 112 on the blinded representation 114 of salted PIN 103 in secure enclave 110 using server secret value 111 to output a blinded output value 115, as described later. Additionally, server 102 may include appropriate technology to implement a robust rate limiting feature. For example, server 102 may implement attempt limiting check function 113 in secure enclave 110 to limit a number of access attempts, as described later. In some examples, computing device 101 is authenticated by server 102, so server 102 is able to determine the particular computing device 101 being employed. Additionally, server 102 may implement anti-rollback functionality in some examples, as described later. After performing attempt limiting check function 113, server 102 provides the blinded output value 115 to computing device 101.

Computing device 101 receives the blinded output value 115 from server 102. Computing device 101 unblinds the blinded output value 115 using local unblinding function 108. Local unblinding function 108 receives blinding factor 107 and the blinded output value 115 as input and outputs high entropy encryption key 109, as described later.

PIN 103 is a low entropy secret value (e.g., a six digit number). In some examples, PIN 103 is associated with computing device 101. For example, as described previously, PIN 103 may never leave computing device 101 in a form that is decipherable.

Application 104 may comprise software, firmware, or other computer-executable instructions installed and executable on computing device 101. Alternatively, application 104 may be hosted or operated remotely (e.g., in a cloud computing instance) or by/for the service. In some examples, PIN 103 is received by application 104 through a user interface presented by application 104. In examples, application 104 may include instructions to enable any or all of the functionality described with respect to computing device 101.

Local salt value 105 is a cryptographically random value that is stored on computing device 101. In some examples, a "cryptographically random value" refers to a value generated by a cryptographically secure pseudorandom number generator. Local salt value 105 is associated with or tied to computing device 101. For example, computing device 101 may have a unique or associated local salt value 105. In some examples, local salt value 105 can be stored unprotected on computing device 101 (e.g., in plain text). In some examples, local salt value 105 is stored on and/or used by computing device 101 across one or more authentication cycles, registration cycles, or both. In examples, an authentication cycle is a process that determines the user's identity (e.g., authenticating PIN 103) before granting, or restricting, access to secure systems or resources (e.g., the service account, or user data). For example, an authentication cycle may be defined as a period of time in between a user entering PIN 103 and either having access granted to the service account or information associated with the service, or having access denied. For example, local salt value 105 remains the same when the user attempts (successfully and/or unsuccessfully) to access or authenticate into the service account, or to access user data, multiple times using PIN 103. When combining local salt value 105 with PIN 103, local salt value 105 may be appended or prepended to PIN 103, or the characters of local salt value 105 may be combined in any other way with the characters of PIN 103. The salted PIN 103 may be blinded by local blinding function 106.

Local blinding function 106 may comprise a function executed by application 104. Local blinding function 106 receives salted PIN 103 and a blinding factor as inputs, and generates a blinded representation 114 of salted PIN 103 based on the local salt value 105, blinding factor 107, and PIN 103. A third party (e.g., a device without access to or knowledge of the blinding factor 107, such as server 102) cannot determine PIN 103 from the blinded representation of PIN 103. Local blinding function 106 may include applying a mathematical operation to the salted PIN 103. For example, local blinding function 106 may include multiplying a hash of the salted PIN 103 by blinding factor 107 raised to a power and then taking the result modulo a large prime number, among other techniques.

Blinding factor 107 may comprise a cryptographically random value (e.g., a local random value) that computing device 101 generates for each authentication cycle. In some examples, computing device 101 discards or deletes blinding factor 107 after using blinding factor 107 in local blinding function 106, after a current authentication cycle, after a registration cycle, and/or after a round of protocol communication between computing device 101 and server 102. In some examples, blinding factor 107 is stored in memory (e.g., volatile memory) by computing device 101.

Local unblinding function 108 may comprise a function executed by application 104 to unblind a blinded output value 115 from server 102. The blinded output value 115 is generated based on OPRF 112 performed by server 102, as discussed herein. Local unblinding function 108 receives blinding factor 107 and the blinded output value 115 as inputs, and generates high entropy key 109 based on blinding factor 107 and the blinded output value 115. Blinding factor 107 used for local unblinding function 108 is the same blinding factor 107 that was used for local blinding function 106 (during the same authentication cycle). In some examples, performing local unblinding function 108 includes applying a mathematical function that is the inverse of the mathematical function applied by the local blinding function 106. In some examples, the unblinded output may be a random value and not a suitable symmetric encryption key (e.g., not the right size for encryption, the entropy of the random integer is not spread over the byte array). Computing device 101 may apply a key derivation function to the unblinded output to generate a suitable symmetric encryption key (e.g., a key that is the right size for encryption, and/or the entropy is evenly spread).

High entropy encryption key 109 (e.g., an export key, a PIN key) may be generated by computing device 101 using local unblinding function 108. In some examples, high entropy encryption key 109 is stored/provided by/from computing device 101 in a way that is indecipherable and/or irreversible to potential attackers (e.g., a one-way function such as a hash function). For example, high entropy encryption key 109 is provided in a format other than cleartext to server 102 (e.g., not provided in cleartext), or is stored in a format other than cleartext on computing device 101 (e.g., not stored in cleartext). For example, high entropy encryption key 109 may be stored as a hashed value by computing device 101 during a setup. During usage/future access attempts, high entropy encryption key 109 is locally tested to ensure high entropy encryption key 109 is the correct value that was generated during setup so high entropy encryption key 109 can be used to encrypt or decrypt user data (e.g., locally stored encrypted user data in the user's vault). For example, high entropy encryption key 109 generated during usage/a current access attempt after setup may be hashed and compared to the hash of the high entropy encryption key 109 that was stored during setup. If the hashes match, authorization is given to computing device 101 to access the service account associated with PIN 103 and its associated user, user data (e.g., a user vault maintained by the service), and/or the like. Once authorization is granted, computing device 101 uses high entropy encryption key 109 to encrypt and/or decrypt data. For example, computing device 101 may use high entropy encryption key 109 to encrypt and/or decrypt passwords or other authentication information (e.g., usernames, emails) stored in the user's vault (e.g., maintained and stored by the service). As such, high entropy encryption key 109 is available for computing device 101 when the correct PIN 103 is received by computing device 101.

Secure enclave 110 may comprise specialized hardware on server 102. On-device secure enclaves are typically built into a hardware computer system including specific technologies that facilitate protection of secret keys. Such secure enclaves may be a separate system from the general-purpose central processing unit (CPU), random-access memory (RAM) and associated input/output processes and devices (I/O) of server 102, whereby the processing that takes place within the secure enclave is not readily accessible from the general-purpose computer system, and strict controls may be used to manage data going into and coming out of the secure enclave. Similarly, the secure enclave can protect security hardware keys. For instance, secure enclaves do not expose the circuitry that handles the secret key to the transport layers that interface with the general-purpose computer system, such as USB, near-field communication (NFC), or BLUETOOTH. Alternatively, secure enclave 110 may be a system provided by the CPU.

Secure enclave 110 may perform OPRF 112 on the blinded representation 114 of PIN 103 provided from computing device 101 to generate the blinded output value, as described herein. Secure enclave 110 stores server secret value 111, which is used in OPRF 112. Secure enclave 110 may also perform an attempt limiting check function 113 on the blinded output value 115 or the blinded representation of PIN 103 to limit a number of access attempts using PIN 103, as described herein. For example, secure enclave 110 stores an attempt counter value, which is used in attempt limiting check function 113, as described herein. In some examples, computing device 101 accesses secure enclave 110 directly via a secure tunnel to access one or more application programming interfaces (APIs) that interact with the attempt counter value to update the attempt counter value. In some examples, server 102 (e.g., secure enclave 110) has anti-rollback functionality. Anti-rollback functionality prevents unauthorized changes or reverting to/resetting the attempt counter.

Server secret value 111 may comprise a cryptographic value securely stored on server 102 (e.g., in secure enclave 110). In some examples, server secret value 111 is unavailable to computing device 101, or any other device outside of server 102 (or, more specifically, outside of secure enclave 110). In some examples, server secret value 111 is loaded on server 102 at bootstrap time and is used by a library of server 102. Server secret value 111 is provided as an input to OPRF 112 within secure enclave 110 to generate a blinded output value 115 that is used to generate high entropy encryption key 109, as discussed herein. In this way, computing device 101, or any other device other than server 102, is unable to generate blinded output value 115 on its own since server secret value 111 is used by server 102 to generate the blinded output value 115, which is used by computing device 101 to generate high entropy encryption key 109.

OPRF 112 may comprise a function executed by server 102 (e.g., more specifically by secure enclave 110) to generate a blinded output value 115. In some examples, server 102 knows server secret value 111 but does not determine or identify the blinded representation of the low entropy secret value and/or the blinded output value 115, and computing device 101 does not determine or identify server secret value 111. OPRF 112 may receive, as inputs, server secret value 111 and the blinded representation 114 of salted PIN 103 provided from computing device 101, and generates the blinded output value 115. In some examples, the blinded output value 115 appears random to devices other than server 102 (e.g., a pseudorandom blinded output value), and is computationally indistinguishable from a truly random function as long as server secret value 111 is kept confidential and securely stored at server 102. However, in some examples, OPRF 112 is a deterministic function in that the same input and secret value produce the same output (the same blinded output value). In this way, future access attempts using a same PIN 103 will yield a same blinded output value. In this manner, a same high entropy encryption key 109 can be generated, the hash of which can be compared at computing device 101 to, for example, a stored hash of high entropy encryption key 109 generated during setup. Server 102 provides the blinded output value 115 to computing device 101 and/or performs attempt limiting check function 113.

Attempt limiting check function 113 may comprise a function executed by server 102 (e.g., during authentication cycles and/or only during authentication cycles and/or during authentication cycles and not during a registration cycle) to limit a number of access attempts using PIN 103. Attempt limiting check function 113 prevents brute force attacks by limiting a number of login attempts (tracked using attempt counter value 301) within a predefined timeframe and/or a predefined login attempt threshold (e.g., tracking total attempts). If the number of login attempts within the predefined timeframe is exceeded and/or the attempt counter value exceeds the predefined login attempt threshold (or reaches zero when decrementing from an initial value), the user's access can be temporarily or permanently blocked or slowed down and/or server 102 may provide an error indication to computing device 101. Server 102 (e.g., more specifically, secure enclave 110) securely stores the attempt counter value. The attempt counter value represents a number of attempts that computing device 101 or the user has left to enter PIN 103. Secure enclave 110 handles updating the attempt counter value. For example, computing device 101 accesses secure enclave 110 directly via a secure tunnel to access one or more APIs that interact with the attempt counter value to update the attempt counter value. For example, the attempt counter value may be set to an initial value during registration and may be decreased after each attempt. Secure enclave 110 may verify that the attempt counter value is greater than zero before performing the attempt limiting check function 113. If the attempt counter value is zero, secure enclave 110 may block access. In such examples, upon entering a correct PIN 103 and computing device 101 achieving access to the service (e.g., authentication is successful), secure enclave 110 may reset the attempt counter value to the initial value. In some examples, computing device 101 computes a message authentication key (MAC) of a cycle transcript (e.g., a trace of each message computing device 101 and server 102 have exchanged) with a key computed using a Key Exchange Protocol based on the computing device 101 private key and the server 102 public key. The private key and the public key are used in the Key Exchange Protocol to generate a shared secret between computing device 101 and server 102. Server 102 may use the shared secret to compute the MAC and compare with the MAC sent by computing device 101 (e.g., computing device 101 sends this MAC to server 102 to prove the success of the attempt). Server 102 verifies the MAC using its own private key and the public key of computing device 101, and upon success, server 102 resets the attempt counter. Achieving this authenticated key protocol ensures to server 102 that computing device 101 has deciphered the encrypted private key (e.g., which is doable typically if the user entered the same low entropy secret used during the registration cycle).

In another example, when a user enters PIN 103, secure enclave 110 increments the attempt counter value by one responsive to an indication from computing device 101 via the secure tunnel. In such examples, upon entering a correct PIN 103 and computing device 101 achieving access to the service (e.g., authentication is successful), secure enclave 110 may reset the attempt counter value to zero.

Figure 2:
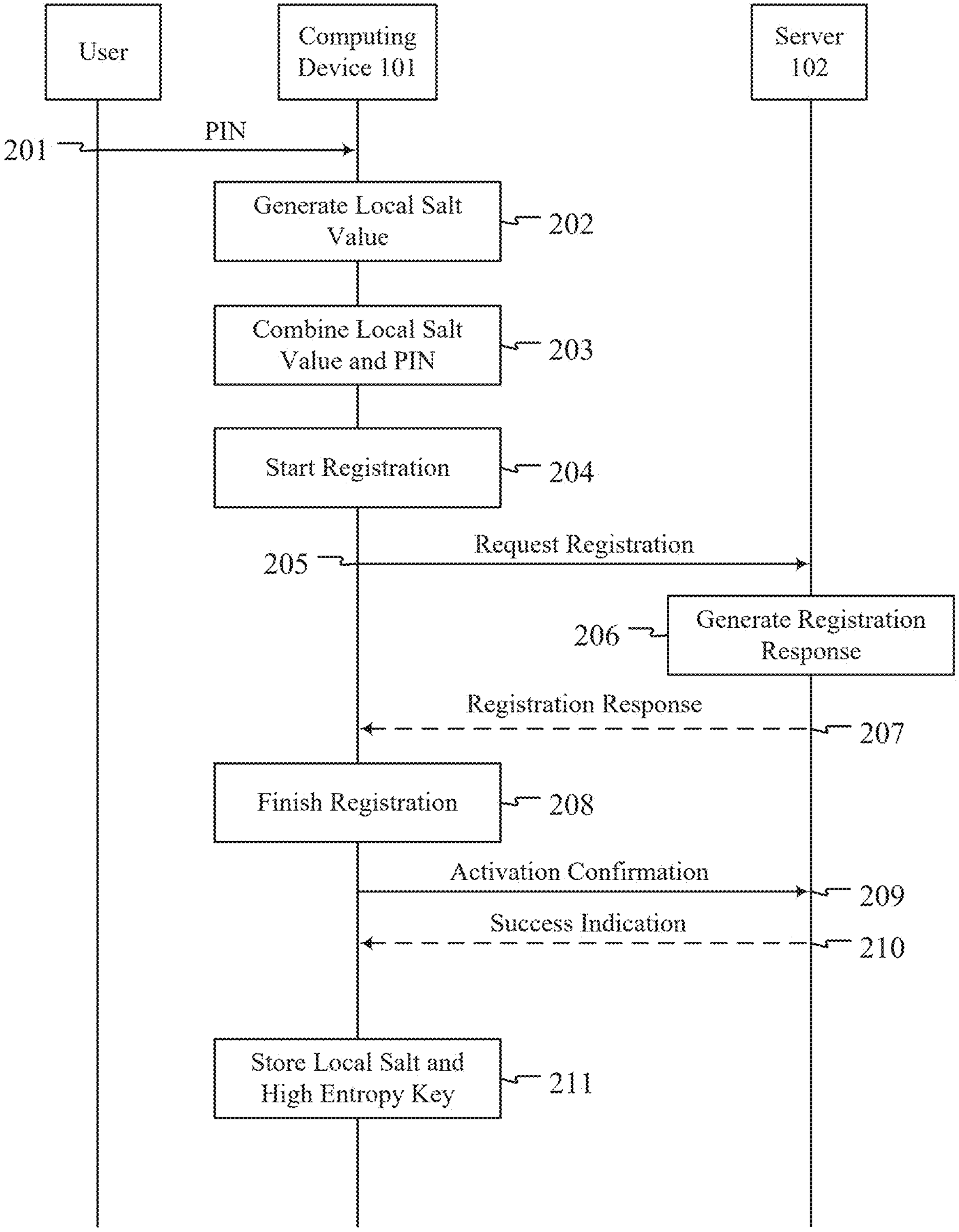
FIG. 2 is a flowchart depicting an example setup method according to aspects of the present application.

FIG. 2 illustrates an example flowchart 200 in accordance with the present application. In some examples, some or all of the operations of flowchart 200 are performed by one or more components of system 100. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the flowchart 200 may be omitted, and in certain examples, other operations may be added. Flowchart 200 generally illustrates operations performed during a setup or registration phase of computing device 101 and/or server 102. For example, flowchart 200 may be performed when a new user account is being established with the service or the service is being accessed for the first time. Flowchart 200 may be referred to as a "registration cycle."

At operation 201, computing device 101 receives PIN 103, or any other low entropy secret, through a user interface. PIN 103 may be an n-length string of characters, such as a six digit number.

At operation 202, computing device 101 generates and/or identifies and stores local salt value 105. Local salt value 105 is associated with computing device 101. For example, computing device 101 may have a unique or associated local salt value 105. For example, local salt value 105 may be tied to computing device 101. Local salt value 105 may be stored across multiple authentication cycles.

At operation 203, computing device 101 combines local salt value 102 and PIN 103. When combining local salt value 105 with PIN 103, local salt value 105 may be appended or prepended to PIN 103, or the characters of local salt value 105 may be combined in any other way with the characters of PIN 103.

At operation 204, computing device 101 starts registration to generate a blinded representation of salted PIN 103. In examples, computing device 101 performs a function that generates a registration state value, which may include blinding factor 107. Blinding factor 107 may be generated/identified for each authentication cycle. A same or a different function may receive, as input, the combined PIN 103 and local salt value 105, and blinding factor 107, and may generate a registration request. In examples, the registration request may include the blinded representation 114 of salted PIN 103 (e.g., computing device 101 blinds PIN 103 using local blinding function 106). In some examples, the registration request includes a request to register the user and/or user data such as a username, login email, and/or password with the service. In some examples, the registration request may include a device ID (e.g., a userDeviceID) of computing device 101. The device ID may be a random unique identifier associated with computing device 101.

At operation 205, computing device 101 calls (e.g., provides an API call or a network request for) a function on server 102 requesting activation of a service account for the user. The call includes the registration request.

At operation 206, server 102 generates a registration response based on the registration request. For example, server 102 performs a function that receives, as inputs, a user identifier (such as an email address) and the registration request, and generates a registration response. In some examples, server 102 performs OPRF 112 using server secret value 111 and the blinded representation of PIN 103 from the registration request as inputs to generate a blinded output value 115. In some examples, the blinded output value 115 appears random (e.g., a pseudorandom blinded output value), and is computationally indistinguishable from a truly random function as long as server secret value 111 is kept confidential and securely stored at server 102 (e.g., within secure enclave 110). The blinded output value 115 is included in the registration response. Server 102 does not receive a discernable version of the PIN 103, as PIN 103 is blinded.

In some examples, server 102 searches for the existence of an attempt counter (e.g., with an attempt count of 1 or greater) and an encrypted private key for the specified userDeviceID. In some examples, when the attempt counter (e.g., with an attempt count of 1 or greater) and/or encrypted private key and/or pin code associated with the user exists, the cycle is considered an authentication cycle, in which case, server 102 performs the attempt limiting check function and provides the blinded output value to computing device 101 as described in FIG. 3. If there is no attempt counter (e.g., with an attempt count of 1 or greater), and/or an encrypted private key, and/or an existing pinCode, the cycle is considered a registration cycle and continues/proceeds with the operations of FIG. 2.

In some examples, server 102 (e.g., secure enclave 110) performs attempt limiting check function 113 to limit a number of access attempts using PIN 103. If the attempt counter value exceeds the predefined login attempt threshold, server 102 may temporarily or permanently block or slow down access attempts by computing device 101 to access server 102 and/or the service account associated with the user. For example, if computing device 101 tries to create too many service accounts (e.g., a number of accounts above a predefined threshold within a predefined timeframe), server 102 may temporarily or permanently block or slow down attempts.

In some examples, at operation 207, server 102 provides the registration response to computing device 101.

At operation 208, computing device 101 finishes registration and unblinds at least a portion of the registration response using local unblinding function 108 to generate high entropy encryption key 109. Local unblinding function 108 receives the blinded output value 115 and blinding factor 107 as input to generate high entropy encryption key 109. In some examples, computing device 101 generates a PIN code verification key pair (e.g., a PIN code verification public key, and a PIN code verification private key). Computing device 101 may generate the PIN code verification key pair at any stage during flowchart 200. Computing device 101 encrypts the PIN code verification private key using the high entropy encryption key 109. Computing device 101 provides the encrypted PIN code verification private key and the PIN code verification public key to server 102. Computing device 101 may additionally provide the PIN code verification public key to server 102. The PIN code verification public key may be a plaintext public key associated with the device ID of computing device 101 (e.g., the userDeviceID). Computing device 101 performs a function to finish registration that may include performing local unblinding function 108. For example, the function to finish registration may include receiving the registration state value (which includes blinding factor 107), registration response (which includes the blinded output value 115), and the combined PIN 103 with local salt value 105 to generate high entropy encryption key 109 and/or a registration record. The registration record may be stored on server 102 and corresponding to a particular user. In some examples, the function to finish registration may generate the PIN code verification key pair and another high entropy encryption key. The finish registration function may create a registrationRecord, embedding the encrypted private part of the key pair with the new high entropy encryption key and the plaintext public part of the key pair. At operation 209, computing device 101 provides a call to server 102 requesting activation confirmation of the service account for the user. The call includes the registration record, in some examples.

In some examples, at operation 210, server 102 provides a success indication to computing device 101 based on the activation confirmation and/or registration record, indicating that the service account for the user has been successfully created and/or activated. The server 102 may store the received registrationRecord.

At operation 211, computing device 101 stores local salt value 105 and high entropy encryption key 109. For example, computing device 101 may store local salt value 105 unprotected. In some examples, computing device 101 hashes high entropy encryption key 109 and stores the hashed value of high entropy encryption key 109 in a secure storage. In some examples, computing device 101 does not store high entropy encryption key 109 in plain text, and/or stores high entropy encryption key 109 in an indecipherable and/or irreversible format (e.g., using a one-way function such as hashing). High entropy encryption keys 109 generated during usage may be hashed and compared to the hash value stored during setup to verify that the correct PIN 103 was entered. Computing device 101 may be able to use high entropy encryption key 109 for encryption/decryption of user data when the hashes match.

Figure 3:
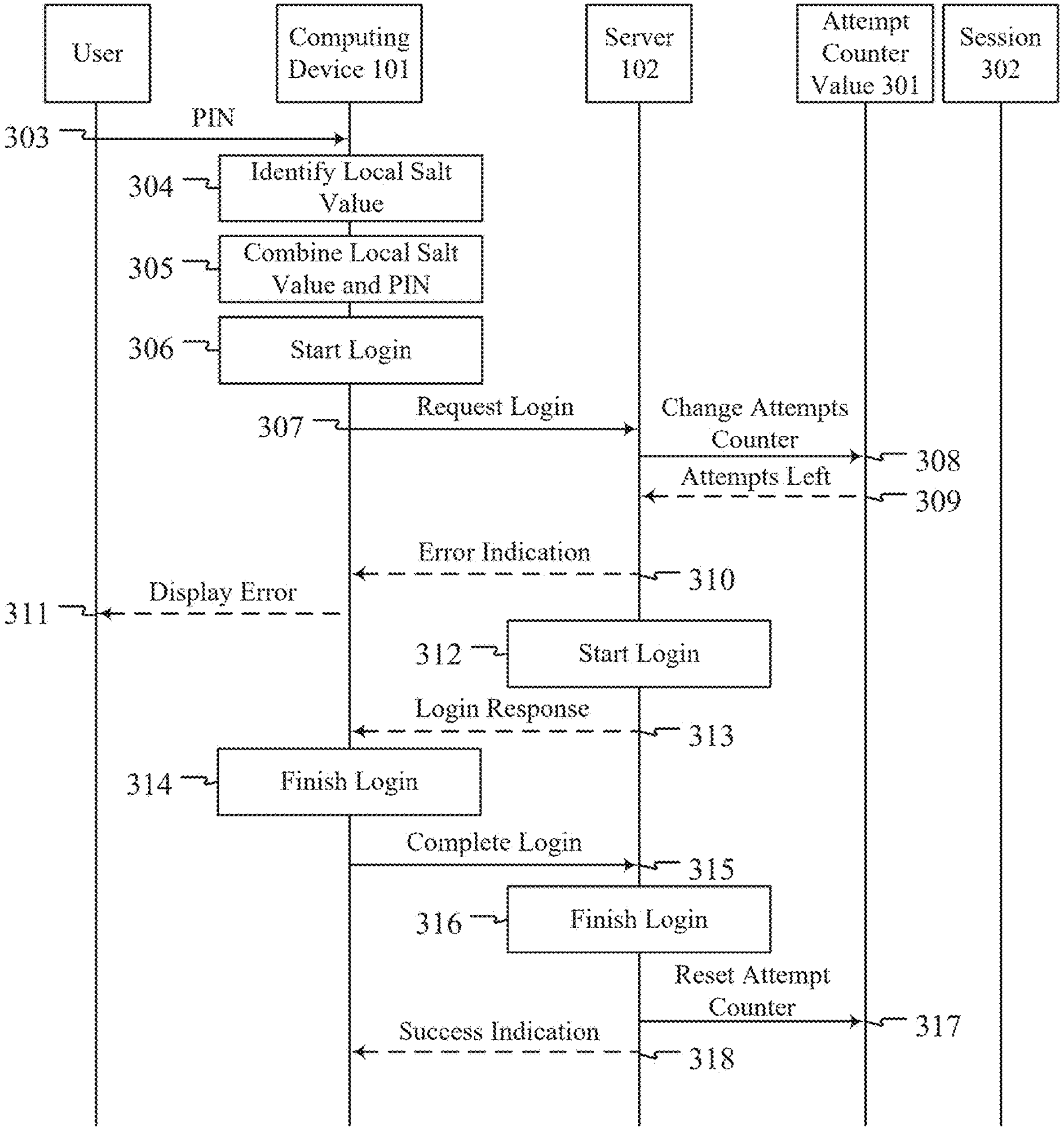
FIG. 3 is a flowchart depicting an example usage method according to aspects of the present application.

FIG. 3 illustrates an example flowchart 300 in accordance with the present application. In some examples, some or all of the operations of flowchart 300 are performed by one or more components of system 100. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the flowchart 300 may be omitted, and in certain examples, other operations may be added. Flowchart 300 generally illustrates operations performed during usage of computing device 101 and/or server 102. Flowchart 300 may include one or more similar steps as in flowchart 200 in some examples. Flowchart 300 may be referred to as a "login cycle," which may occur after the "registration cycle." Multiple login cycles may occur one after another.

At operation 303, computing device 101 receives PIN 103, or any other low entropy secret, through a user interface. PIN 103 may be an n-length string of characters, such as a six digit number.

At operation 304, computing device 101 computing device 101 identifies local salt value 105. Local salt value 105 is associated with computing device 101. For example, computing device 101 may have a unique or associated local salt value 105. Local salt value 105 may be stored across multiple authentication cycles.

At operation 305, computing device 101 computing device 101 combines local salt value 102 and PIN 103. When combining local salt value 105 with PIN 103, local salt value 105 may be appended or prepended to PIN 103, or the characters of local salt value 105 may be combined in any other way with the characters of PIN 103.

At operation 306, computing device 101 starts login to generate a blinded representation 114 of salted PIN 103. In examples, computing device 101 performs a function that generates a computing device login state value, which may include blinding factor 107. Blinding factor 107 may be generated for each authentication cycle. A same or a different function receives, as inputs, the combined PIN 103 and local salt value 105, and blinding factor 107, and generates a login request, which may include the blinded representation of PIN 103 (e.g., computing device 101 blinds PIN 103 using local blinding function 106). In some examples, the login request includes a request to login the user and may include a user identifier used during registration, such as a username, login email, and/or password for the service. In some examples, the login request may include a device ID (e.g., a userDeviceID) of computing device 101. The device ID may be a random unique identifier associated with computing device 101.

At operation 307, computing device 101 calls (e.g., provides an API call or a network request for) a function on server 102 requesting login to the service account for the user. The call may include the login request, a login request embedding the blinded representation of PIN 103, and/or a device ID, which may identify computing device 101 (e.g., is a unique identifier associated with computing device 101). In some examples, server 102 verifies the device ID to ensure that computing device 101 is an authorized device.

At operation 308, server 102 provides an indication to secure enclave 110 to attempt to change (e.g., increment) attempt counter value 301. As discussed, attempt counter value 301 may be kept by secure enclave 110. Server 102 may perform an attempt limiting check function 113 to limit a number of access attempts using PIN 103. In some examples, the indication includes the device ID. Secure enclave 110 may check the device ID before allowing the attempt counter 301 to be updated. In some other examples, computing device 101 accesses secure enclave 110 directly via a secure tunnel to update attempt counter value 301. In some examples, computing device 101 provides an indication via the secure tunnel, where the indication includes the device ID of computing device 101.

In some examples, at operation 309, server 102 or computing device 101 receives attempt counter value 301, or a number of remaining attempts (e.g., a difference between the predefined login attempt threshold and attempt counter value 301), from secure enclave 110.

In some examples, at operation 310, server 102 provides, to computing device 101, an error indication indicating that a maximum number of attempts has been reached if the attempt counter value 301 equals or exceeds the predefined login attempt threshold. For example, when server 102 performs attempt limiting check function 113 to limit a number of access attempts using PIN 103, server 102 provides the error indication if the maximum number of attempts has been reached if the attempt counter value 301 equals or exceeds the predefined login attempt threshold.

In some examples, at operation 311, computing device 101 indicates to the user (e.g., displays a message to the user indicating) that the maximum number of attempts has been reached. In some examples, server 102 may temporarily or permanently block or slow down access attempts by computing device 101 to access server 102 and/or the service account associated with the user. In some examples, server 102 may delete the registration record for computing device 101 when the maximum number of attempts has been reached.

At operation 312, server 102 starts login and generates a login response based on the login request if the maximum number of attempts has not been reached. For example, server 102 performs a function that receives, as inputs, the device ID, the registration record stored by server 102, and/or the login request, and generates a login response and/or a server login state value, which is used to update attempt counter value 301 and indicates the login state of the service account of the user at server 102. In some examples, server 102 performs OPRF 112 using server secret value 111 and the blinded representation 114 of PIN 103 from the loginrequest as input to generate a blinded output value 115. In some examples, the blinded output value 115 appears random (e.g., a pseudorandom blinded output value), and is computationally indistinguishable from a truly random function as long as server secret value 111 is kept confidential and securely stored at server 102. The blinded output value 115 is included in the login response. Server 102 does not receive a discernable version of the PIN 103, as PIN 103 is blinded.

In some examples, server 102 searches for the existence of an attempt counter (e.g., with an attempt count of 1 or greater) and an encrypted private key for the specified device ID (e.g., userDeviceID). In some examples, when the attempt counter (e.g., with an attempt count of 1 or greater) and/or encrypted private key and/or pin code associated with the user exists, the cycle is considered an authentication cycle, in which case, server 102 performs the attempt limiting check function and provides the blinded output value to computing device 101. If there is no attempt counter (e.g., with an attempt count of 1 or greater), and/or an encrypted private key, and/or an existing pinCode, the cycle is considered a registration cycle.

At operation 313, server 102 provides the login response (e.g., which may include or embed the registration record and/or blinded output value 115) to computing device 101.

At operation 314, computing device 101 finishes login and unblinds at least a portion of the login response using local unblinding function 108 to generate high entropy encryption key 109. Local unblinding function 108 receives the blinded output value 115 and blinding factor 107 as inputs to generate high entropy encryption key 109. Computing device 101 performs a function to finish login that may include performing local unblinding function 108. For example, the function to finish login may include receiving the computing device login state value (which includes blinding factor 107), login response (which includes the blinded output value 115), and the combined PIN 103 with local salt value 105 to generate high entropy encryption key 109, a computing device or application session key, and/or a finish login request. The computing device or application session key is a cryptographic key used to encrypt and decrypt data transmitted between computing device 101 and server 102 during a communication (e.g., login) session. The finish login request may include a value (e.g., a Message Authentication Code (MAC) computed with a key and transcript from the key exchange) proving to the server that the protocol succeed, and that the client was able to gain access to its high entropy encryption key 109. This proof is used by the server to reset the attempt counter. In some examples, resetting the counter to the initial value is done when an authentication cycle is successful. In some examples, the blinded output is sent by server 102 to computing device 101 alongside with the encrypted private key and the plaintext public key (e.g., the PIN code verification public key, and the encrypted PIN code verification private key) generated by computing device 101 during the registration cycle (e.g., at operation 208 from FIG. 2). In some examples, computing device 101 decrypts the encrypted PIN code verification private key with the high entropy encryption key derived from the blinded output value 115 during the login cycle. The computing device 101 signs some information using the decrypted private key or information based on the decrypted private key and provides this signed information to server 102. The server 102 uses the public key (e.g., PIN code verification public key) to verify the signature. The server 102 is able to determine that the authentication is successful and reset the attempt counter 301 when it verifies the signature. In some examples, the first computing device computes a MAC of the cycle transcript (e.g., the timestamp of the cycle, the userDeviceID and additional meta-data) with a key computed using a key exchange protocol based on the first computing device private key and the second computing device public key. In some examples, the first computing device sends this MAC to the second computing device to prove the success of the attempt, the second computing device verifies the MAC using its own private key and the public key of the first computing device, and upon success, the second computing device reset the attempt counter 301. Achieving this authenticated key protocol guarantees to the second device the first computing device has been able to decipher the encrypted private key, which itself is doable only if the user typed the same low entropy secret that he used during the registration cycle.

High entropy encryption key 109 may be hashed and compared to the hash value stored during setup to verify that the correct PIN 103 was entered. Computing device 101 may be able to use high entropy encryption key 109 to encrypt/decrypt user data (e.g., to decrypt user vault data and/or encrypt data for storage in the user's vault) when the hashes match.

At operation 315, computing device 101 provides a call to server 102 for login completion for the user (e.g., into the service account). The call includes the finish login request and/or computing device in some examples.

At operation 316, server 102 finishes login and generates a server session key using the finish login request. For example, server 102 performs a function that receives, as inputs, the finish login request and the server login state, and generates a server session key based on the inputs.

At operation 317, server 102 (e.g., secure enclave 110) resets attempt counter value 301 (e.g., to zero) upon validation of the finish login request.

At operation 318, server 102 provides a success indication to computing device 101 indicating that login is finished and successful and/or that the attempt counter value 301 is reset.

Figure 4A:
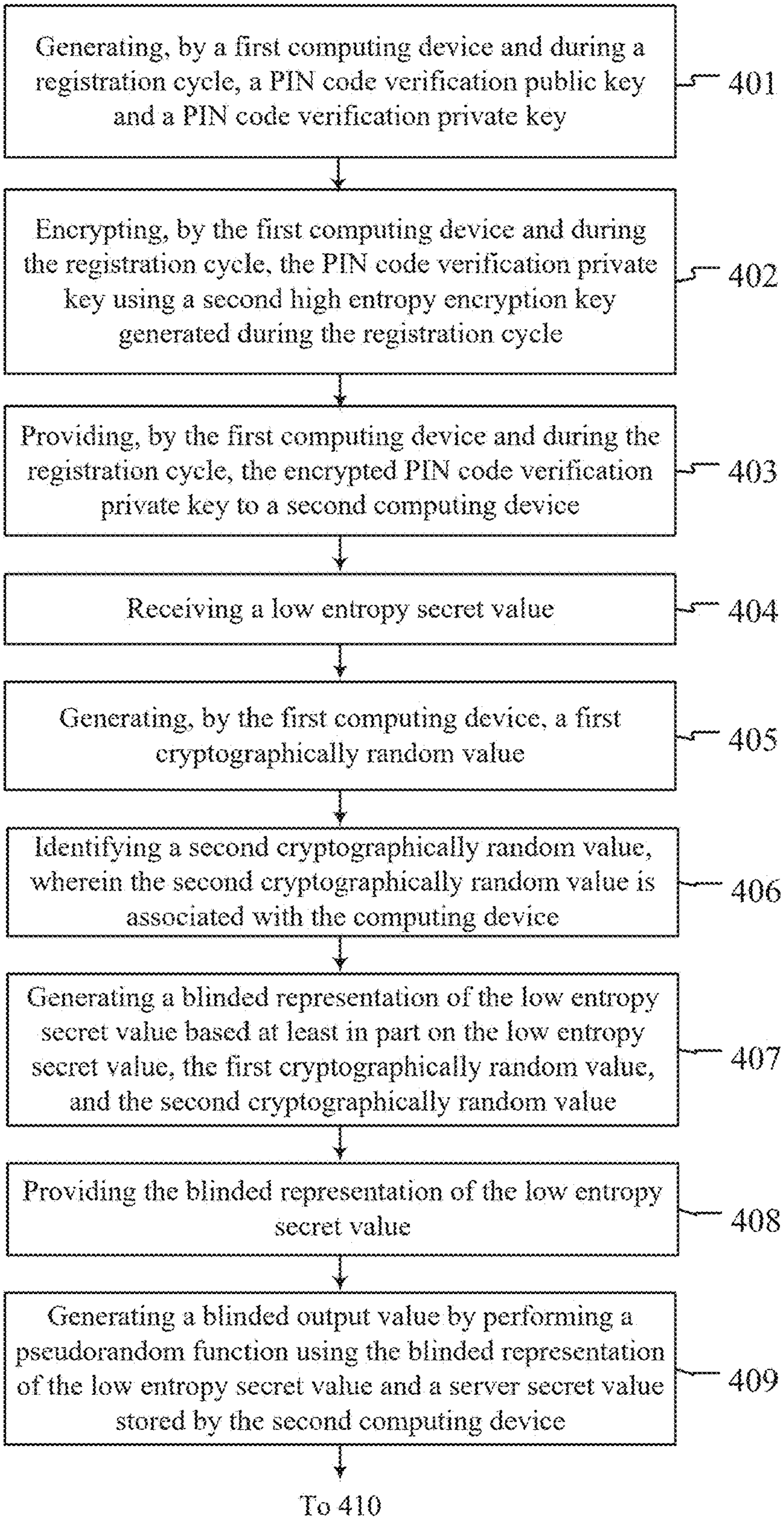
FIGS. 4A-4C are a method flow depicting an example method according to aspects of the present application.
Figure 4B:
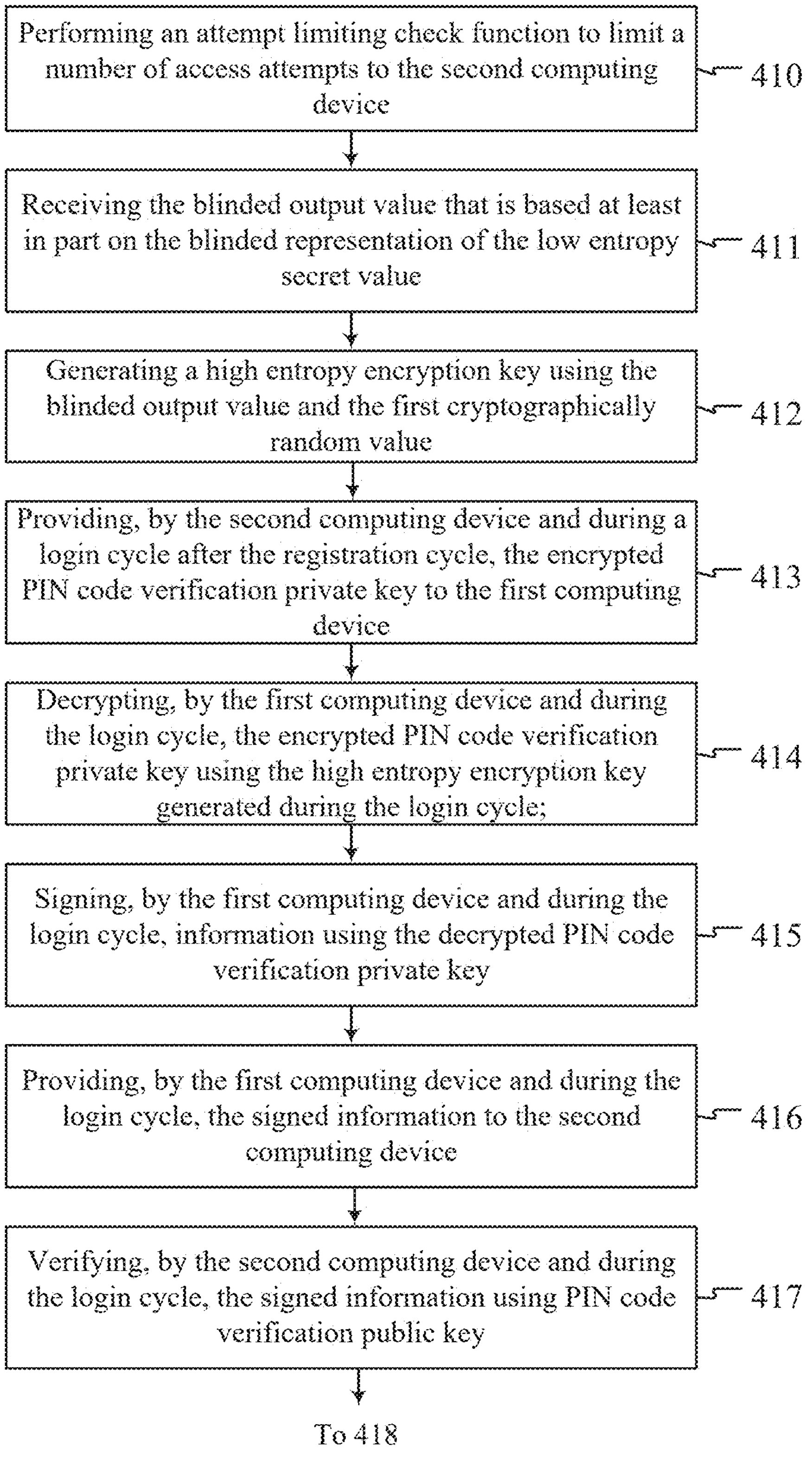
Figure 4C:
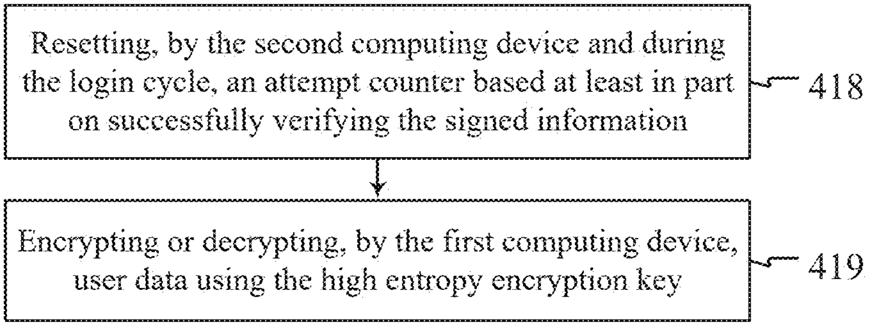

FIGS. 4A-4C illustrate an example method 400 in accordance with the present application. In examples, some or all of the operations of method 400 are performed by one or more components of system 100. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the method 400 may be omitted, and in certain examples, other operations may be added.

At operation 401, the method may include generating, by a first computing device and during a registration cycle, a PIN code verification public key and a PIN code verification private key.

At operation 402, the method may include encrypting, by the first computing device and during the registration cycle, the PIN code verification private key using a second high entropy encryption key generated during the registration cycle.

At operation 403, the method may include providing, by the first computing device and during the registration cycle, the encrypted PIN code verification private key to a second computing device.

At operation 404, the method may include receiving, by the first computing device, a low entropy secret value. In some examples, the low entropy secret value comprises a PIN.

At operation 405, the method may include generating, by the first computing device, a first cryptographically random value. In some examples, the first cryptographically random value is discarded after a single authentication cycle, a single registration cycle, or both.

At operation 406, the method may include identifying, by the first computing device, a second cryptographically random value, wherein the second cryptographically random value is associated with the computing device. In some examples, the second cryptographically random value is unique or associated to the first computing device and stored on the first computing device across multiple authentication cycles.

At operation 407, the method may include generating, by the first computing device, a blinded representation of the low entropy secret value based at least in part on the low entropy secret value, the first cryptographically random value, and the second cryptographically random value. In some examples, generating the blinded representation of the low entropy secret value comprises performing a local blinding function based at least in part on the low entropy secret value, the first cryptographically random value, and the second cryptographically random value to blind the low entropy secret value.

At operation 408, the method may include providing, by the first computing device and to a second computing device, the blinded representation of the low entropy secret value.

At operation 409, the method may include generating, by the second computing device, a blinded output value by performing an OPRF using the blinded representation of the low entropy secret value and a server secret value stored by the second computing device.

At operation 410, the method may include performing, by the second computing device and using the low entropy secret value, an attempt limiting check function to limit a number of access attempts to the second computing device.

At operation 411, the method may include receiving, from the second computing device and by the first computing device, the blinded output value that is based at least in part on the blinded representation of the low entropy secret value.

At operation 412, the method may include generating, by the first computing device, a high entropy encryption key using the blinded output value and the first cryptographically random value. In some examples, generating, by the first computing device, the high entropy encryption key comprises performing a local unblinding function using the blinded output value and the first cryptographically random value to unblind the blinded output value.

At operation 413, the method may include providing, by the second computing device and during a login cycle after the registration cycle, the encrypted PIN code verification private key to the first computing device.

At operation 414, the method may include decrypting, by the first computing device and during the login cycle, the encrypted PIN code verification private key using the high entropy encryption key generated during the login cycle.

At operation 415, the method may include signing, by the first computing device and during the login cycle, information using the decrypted PIN code verification private key.

At operation 416, the method may include providing, by the first computing device and during the login cycle, the signed information to the second computing device.

At operation 417, the method may include verifying, by the second computing device and during the login cycle, the signed information using PIN code verification public key.

At operation 418, the method may include resetting, by the second computing device and during the login cycle, an attempt counter based at least in part on successfully verifying the signed information.

At operation 419, the method may include encrypting or decrypting, by the first computing device, user data using the high entropy encryption key.

Figure 5:
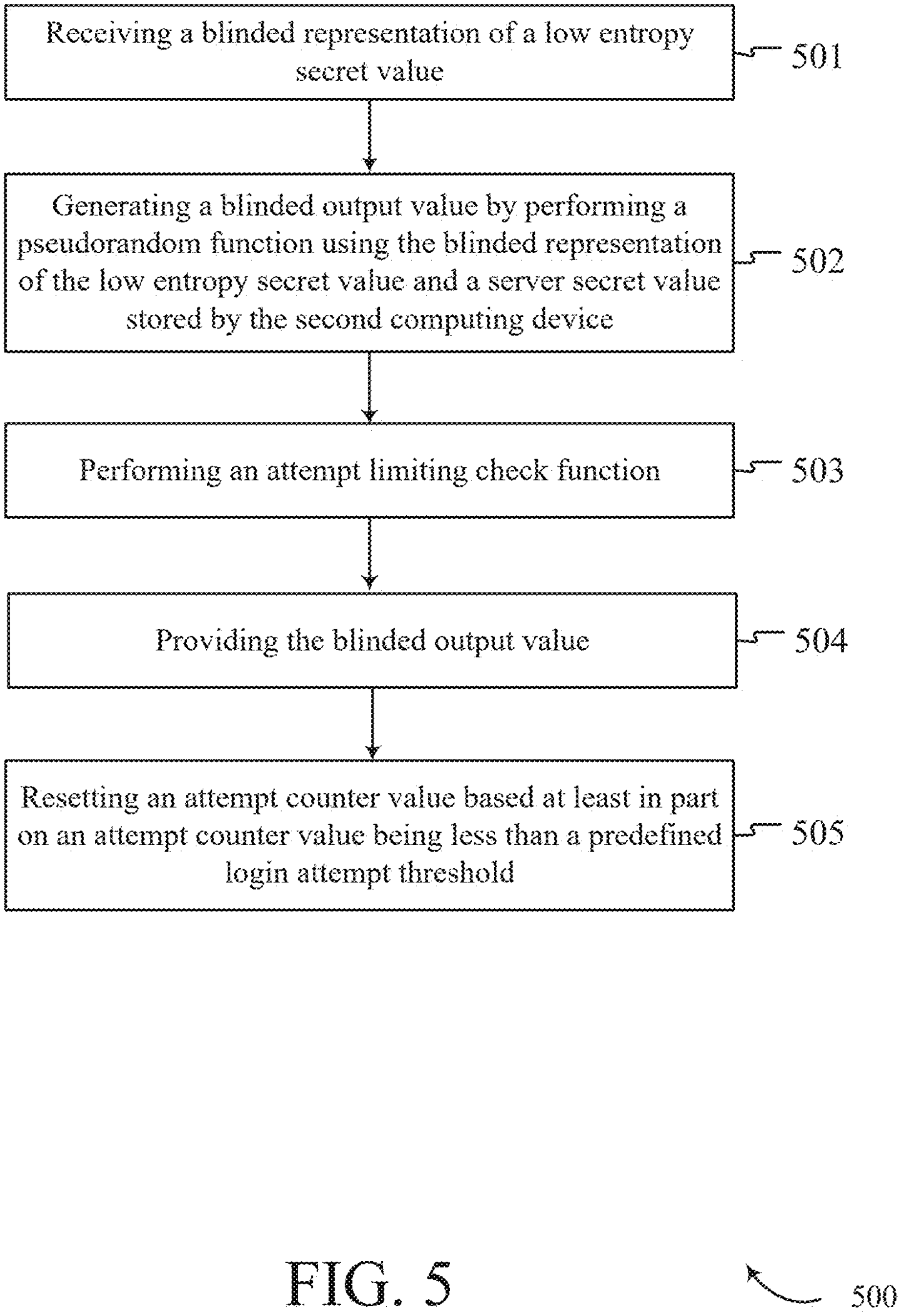
FIG. 5 is a method flow depicting an example method according to aspects of the present application.

FIG. 5 illustrates an example method 500 in accordance with the present application. In examples, some or all of the operations of method 500 are performed by one or more components of system 100. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the method 500 may be omitted, and in certain examples, other operations may be added.

At operation 501, the method may include receiving, from a first computing device and by a second computing device, a blinded representation of a low entropy secret value. In some examples, the second computing device is a server comprising a secure enclave.

At operation 502, the method may include generating, by the second computing device, a blinded output value by performing an OPRF using the blinded representation of the low entropy secret value and a server secret value stored by the second computing device.

At operation 503, the method may include performing, by the second computing device, an attempt limiting check function. In some examples, performing the attempt limiting check function comprises providing an error indication to the first computing device based at least in part on an attempt counter value exceeding a predefined login attempt threshold.

At operation 504, the method may include providing, by the second computing device and to the first computing device, the blinded output value.

At operation 505, the method may include resetting an attempt counter value based at least in part on an attempt counter value being less than a predefined login attempt threshold.

Figure 6:
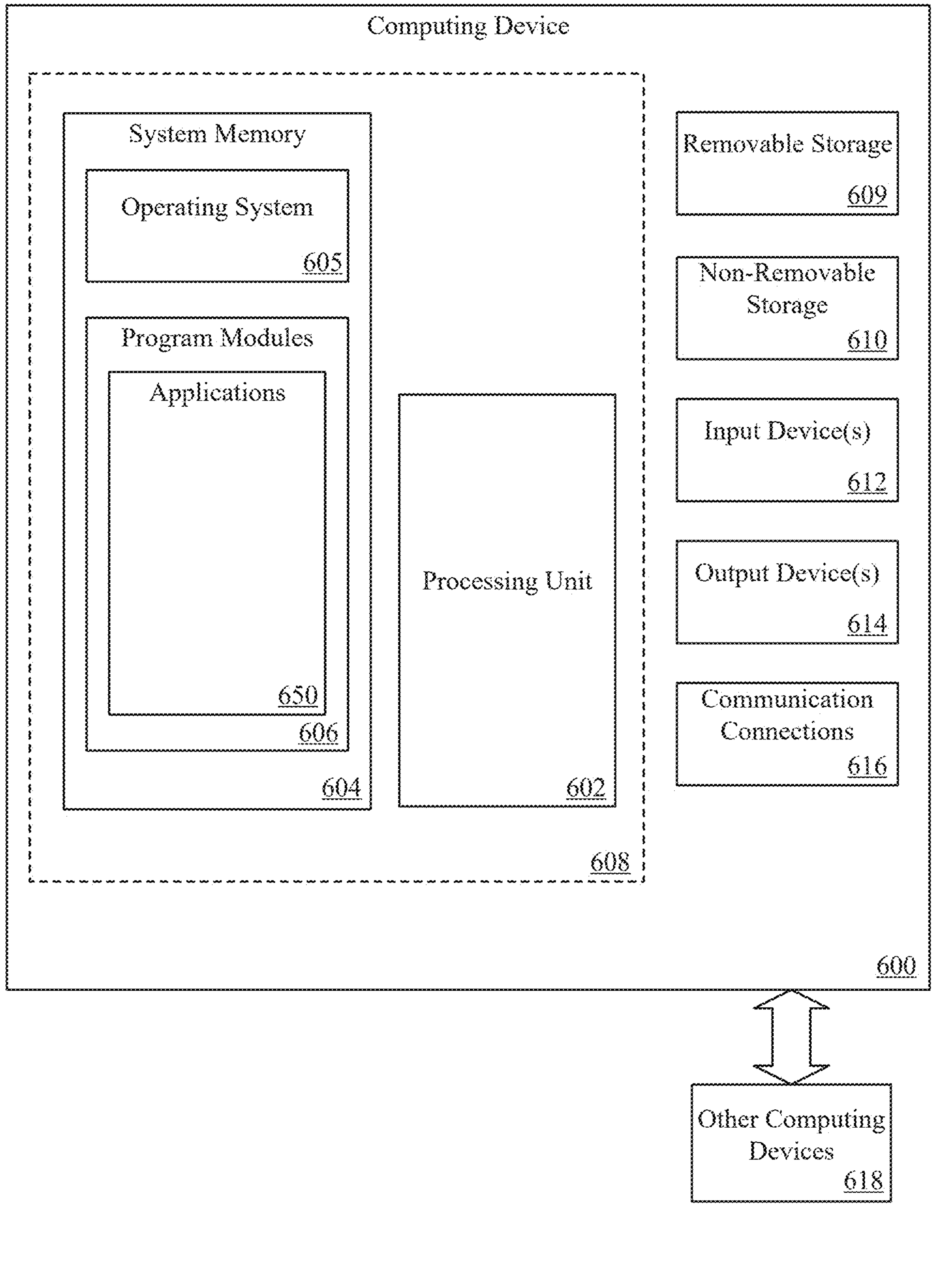
FIG. 6 is a block diagram depicting an example computing environment in which systems and methods of the present application may be implemented.

FIG. 6 is a block diagram illustrating physical components (i.e., hardware) of a computing device 600 with which examples of the present disclosure may be practiced. The computing device components described below may be suitable for a customer device implanting computing device 101, server 102, application 104, secure enclave 110, or other components of FIG. 1. In a basic configuration, the computing device 600 may include at least one processing unit 602 and a system memory 604. The processing unit(s) (e.g., processors) may be referred to as a processing system. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650 to implement one or more of the systems described above with respect to FIG. 1.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, solid state drives, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, one or more of the operations of the methods illustrated in FIGS. 2-5. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:

receiving, by a first computing device, a low entropy secret value;

generating, by the first computing device, a first cryptographically random value;

identifying, by the first computing device, a second cryptographically random value, wherein the second cryptographically random value is associated with the computing device;

generating, by the first computing device, a blinded representation of the low entropy secret value based at least in part on the low entropy secret value, the first cryptographically random value, and the second cryptographically random value;

providing, by the first computing device and to a second computing device, the blinded representation of the low entropy secret value;

receiving, from the second computing device and by the first computing device, a blinded output value that is based at least in part on the blinded representation of the low entropy secret value;

generating, by the first computing device, a high entropy encryption key using the blinded output value and the first cryptographically random value; and encrypting or decrypting, by the first computing device, user data using the high entropy encryption key.

2. The method of claim 1, further comprising:

generating, by the second computing device, the blinded output value by performing an oblivious pseudorandom function using the blinded representation of the low entropy secret value and a server secret value stored by the second computing device.

3. The method of claim 1, further comprising:

performing, by the second computing device and using the low entropy secret value, an attempt limiting check function to limit a number of access attempts to the blinded output value.

4. The method of claim 1, wherein generating the blinded representation of the low entropy secret value comprises performing a local blinding function based at least in part on the low entropy secret value, the first cryptographically random value, and the second cryptographically random value to blind the low entropy secret value.

5. The method of claim 1, wherein generating, by the first computing device, the high entropy encryption key comprises performing a local unblinding function using the blinded output value and the first cryptographically random value to unblind the blinded output value.

6. The method of claim 1, further comprising:

generating, by the first computing device and during a registration cycle, a PIN code verification public key and a PIN code verification private key;

encrypting, by the first computing device and during the registration cycle, the PIN code verification private key using a second high entropy encryption key generated during the registration cycle;

providing, by the first computing device and during the registration cycle, the encrypted PIN code verification private key to the second computing device;

providing, by the second computing device and during a login cycle after the registration cycle, the encrypted PIN code verification private key to the first computing device;

decrypting, by the first computing device and during the login cycle, the encrypted PIN code verification private key using the high entropy encryption key generated during the login cycle;

signing, by the first computing device and during the login cycle, information using the decrypted PIN code verification private key;

providing, by the first computing device and during the login cycle, the signed information to the second computing device;

verifying, by the second computing device and during the login cycle, the signed information using PIN code verification public key; and resetting, by the second computing device and during the login cycle, an attempt counter based at least in part on successfully verifying the signed information.

7. The method of claim 1, wherein the first cryptographically random value is discarded after a single authentication cycle, after a single registration cycle, or both.

8. The method of claim 7, wherein the second cryptographically random value is unique to the first computing device and is stored and used on the first computing device across one or more authentication cycles, registration cycles, or both.

9. A method, comprising:

receiving, from a first computing device and by a second computing device, a blinded representation of a low entropy secret value;

generating, by the second computing device, a blinded output value by performing an oblivious pseudorandom function using the blinded representation of the low entropy secret value and a server secret value stored by the second computing device;

performing, by the second computing device, an attempt limiting check function; and providing, by the second computing device and to the first computing device, the blinded output value.

10. The method of claim 9, further comprising:

resetting an attempt counter value based at least in part on an attempt counter value being less than a predefined login attempt threshold.

11. The method of claim 9, wherein performing the attempt limiting check function limits a number of access attempts to the blinded output value.

12. The method of claim 9, wherein the second computing device is a server comprising a secure enclave.

13. A system comprising:

at least one processor; and memory, operatively connected to the at least one processor and storing executable instructions that, when executed, cause the at least one processor to perform operations, the operations comprising:

receiving, by a first computing device, a low entropy secret value;

generating, by the first computing device, a first cryptographically random value;

identifying, by the first computing device, a second cryptographically random value, wherein the second cryptographically random value is unique to the computing device;

generating, by the first computing device, a blinded representation of the low entropy secret value based at least in part on the low entropy secret value, the first cryptographically random value, and the second cryptographically random value;

providing, by the first computing device and to a second computing device, the blinded representation of the low entropy secret value;

receiving, from the second computing device and by the first computing device, a blinded output value that is based at least in part on the blinded representation of the low entropy secret value;

generating, by the first computing device, a high entropy encryption key using the blinded output value and the first cryptographically random value; and encrypting or decrypting, by the first computing device, user data using the high entropy encryption key.

14. The system of claim 13, the operations further comprising:

generating, by the second computing device, the blinded output value by performing an oblivious pseudorandom function using the blinded representation of the low entropy secret value and a server secret value stored by the second computing device.

15. The system of claim 13, the operations further comprising:

performing, by the second computing device and using the low entropy secret value, an attempt limiting check function to limit a number of access attempts to the second computing device.

16. The system of claim 13, wherein generating the blinded representation of the low entropy secret value comprises performing a local blinding function based at least in part on the low entropy secret value, the first cryptographically random value, and the second cryptographically random value to blind the low entropy secret value.

17. The system of claim 13, wherein generating, by the first computing device, the high entropy encryption key comprises performing a local unblinding function using the blinded output value and the first cryptographically random value to unblind the blinded output value.

18. The system of claim 13, wherein the low entropy secret value comprises a personal identification number (PIN).

19. The system of claim 13, wherein the first cryptographically random value is discarded after a single authentication cycle, a single registration, cycle, or both.

20. The system of claim 19, wherein the second cryptographically random value is unique to the first computing device and is stored and used on the first computing device across one or more authentication cycles, registration cycles, or both.

* * * * *